(12) United States Patent
Tucker

(10) Patent No.: US 12,422,558 B2
(45) Date of Patent: Sep. 23, 2025

(54) WIRELESS HANDHELD MOBILE DEVICE CONFIGURED FOR LOCATION VISUALIZATION OF INTERNET-OF-THINGS DEVICE

(71) Applicant: T-Mobile USA, Inc., Bellevue, WA (US)

(72) Inventor: Wilfred I. Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 267 days.

(21) Appl. No.: 18/184,895

(22) Filed: Mar. 16, 2023

(65) Prior Publication Data

US 2024/0310527 A1    Sep. 19, 2024

(51) Int. Cl.
*G01S 17/894*    (2020.01)
*G01S 17/08*    (2006.01)

(52) U.S. Cl.
CPC ............ *G01S 17/894* (2020.01); *G01S 17/08* (2013.01)

(58) Field of Classification Search
CPC ....... G01S 17/894; G01S 17/08; H04W 4/029
See application file for complete search history.

(56) References Cited

U.S. PATENT DOCUMENTS 9,591,453 B1 *   3/2017  Hyde .................. G01S 5/0231
9,824,571 B2    11/2017  Sedayao et al.
10,313,914 B2    6/2019  Huang et al.
10,477,395 B2   11/2019  Bahrami et al.
10,484,477 B2   11/2019  Nasir et al.
10,627,882 B2    4/2020  Swierk et al.
10,686,670 B2    6/2020  Patra et al.
11,050,827 B1    6/2021  Yeoh et al.
11,176,744 B2 * 11/2021  Bleyer ............... G02B 27/0101
11,263,099 B2    3/2022  Ahmet et al.
11,436,117 B2    9/2022  Grant et al.
11,463,130 B1   10/2022  Garner et al.
(Continued)

FOREIGN PATENT DOCUMENTS

CN    109165329 A    1/2019
CN    109246195 A    1/2019
(Continued)

OTHER PUBLICATIONS

Extended European Search Report from EP Appl. Ser. No. 24163935.0 mailed Aug. 27, 2024 (10 pages).

*Primary Examiner* — Mohamed A. Wasel
(74) *Attorney, Agent, or Firm* — Perkins Coie LLP

(57) ABSTRACT

Systems, methods, and devices for improving the ability to detect the location of a misplaced or lost Internet-of-Things (IoT) device. A 3D visualization of a physical environment including the misplaced IoT device and one or more physical objects is captured using a visualization sensor in a handheld mobile device. An estimation of the distance between the IoT device and at least the handheld mobile device or one or more physical objects is determined. Using the estimated distance between the IoT device and at least the handheld mobile device or one or more physical objects, the 3D visualization is augmented with location data. In doing so, the handheld mobile device is able to display a mapping of the environment including an indication of the location of the IoT device in the 3D visualization, allowing a user to find the misplaced or lost IoT device.

16 Claims, 4 Drawing Sheets

(56) References Cited

U.S. PATENT DOCUMENTS

| | | |
|---|---|---|
| 11,586,853 B2 | 2/2023 | Iyer et al. |
| 2015/0185311 A1* | 7/2015 | Lohier .................... G06F 21/88 |
| | | 367/118 |
| 2018/0376448 A1 | 12/2018 | Wild et al. |
| 2020/0092376 A1 | 3/2020 | Morris |
| 2020/0162500 A1 | 5/2020 | Ciocarlie et al. |
| 2020/0397936 A1 | 12/2020 | Deros et al. |
| 2021/0365038 A1* | 11/2021 | Ma ........................ G01S 15/931 |
| 2022/0044016 A1 | 2/2022 | Pan et al. |
| 2022/0161818 A1 | 5/2022 | Solmaz et al. |
| 2022/0201428 A1* | 6/2022 | Ertan ........................ G06T 7/70 |
| 2022/0286805 A1* | 9/2022 | Vaizman ............... H04W 24/08 |
| 2022/0377560 A1 | 11/2022 | Zeng |
| 2023/0004689 A1 | 1/2023 | Santarone et al. |
| 2023/0049986 A1 | 2/2023 | Vilale et al. |
| 2023/0077780 A1 | 3/2023 | Decrop et al. |
| 2023/0169695 A1* | 6/2023 | Mene ..................... G06V 20/20 |
| | | 345/633 |

FOREIGN PATENT DOCUMENTS

| | | |
|---|---|---|
| CN | 109831471 A | 5/2019 |
| CN | 110149353 A | 8/2019 |
| CN | 111107675 B | 3/2021 |
| CN | 112561309 A | 3/2021 |
| CN | 113076097 A | 7/2021 |
| CN | 108415350 B | 9/2021 |
| KR | 20160023368 A | 3/2016 |
| KR | 20160066292 A | 6/2016 |
| KR | 101772314 B1 | 9/2017 |
| KR | 101773768 B1 | 9/2017 |
| KR | 101928519 B1 | 12/2018 |
| KR | 20200082901 A | 7/2020 |
| KR | 102441454 B1 | 9/2022 |
| WO | 2019006179 A1 | 1/2019 |
| WO | 2020107497 A1 | 6/2020 |
| WO | 2020214708 A1 | 10/2020 |
| WO | 2021032214 A1 | 2/2021 |

* cited by examiner

WIRELESS HANDHELD MOBILE DEVICE CONFIGURED FOR LOCATION VISUALIZATION OF INTERNET-OF-THINGS DEVICE

BACKGROUND

Handheld mobile devices such as smartphones are powerful computing devices with a number of sensors that provide real-time location data to enable enhanced location-enabled information, entertainment, advertising, and security services.

An asset tracking app and related services enable users to use their handheld mobile devices to track the location of other mobile devices such as tablets or smartwatches. The tracked devices are supported by the tracking device with related operating systems through a connected account. Users can also share their global positioning system (GPS) locations to others with similarly supported devices and view the location of others who choose to share their location.

BRIEF DESCRIPTION OF THE DRAWINGS

Detailed descriptions of implementations of the present invention will be described and explained through the use of the accompanying drawings.

Figure 1:
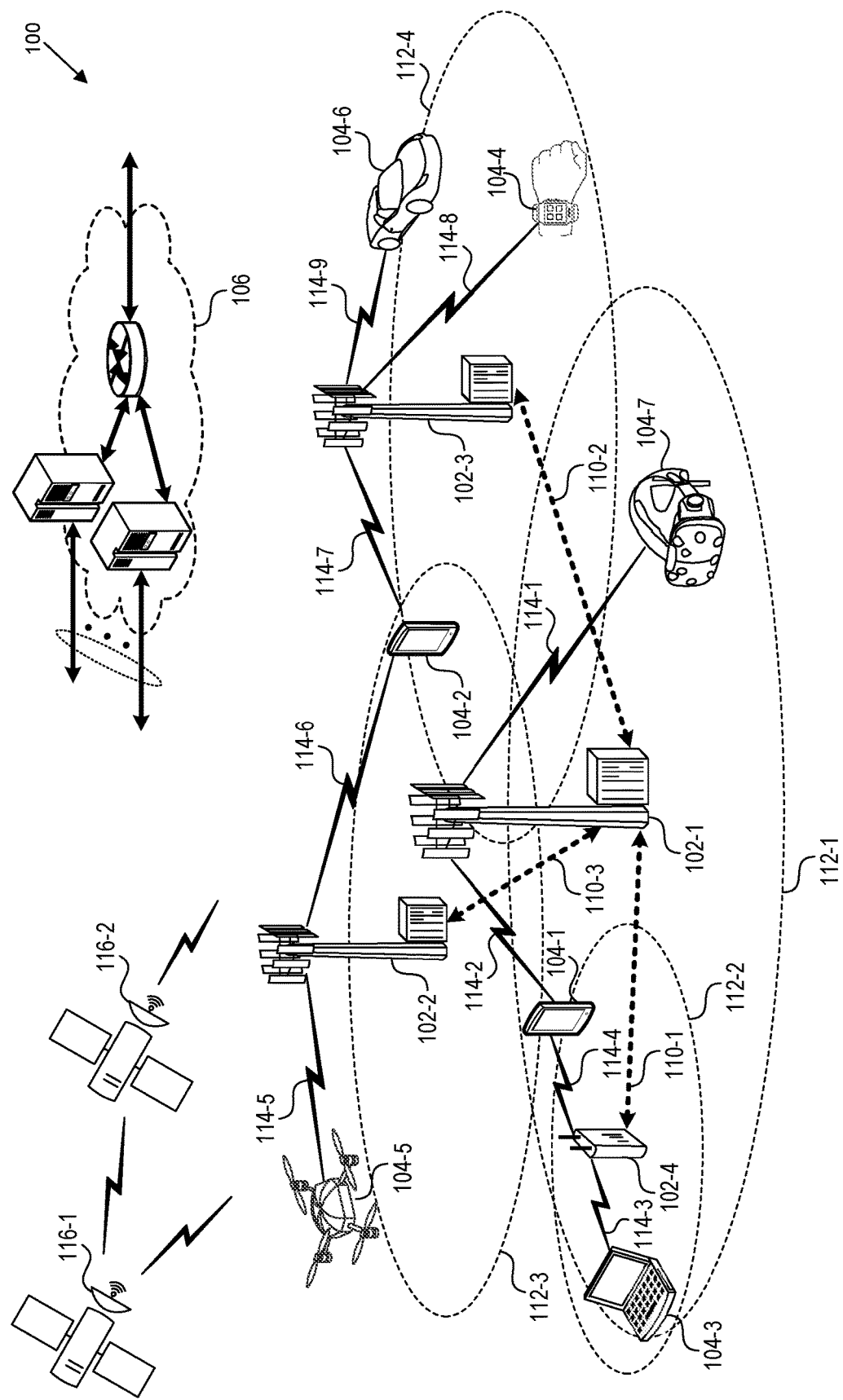
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology improves the ability to detect the location of a misplaced or lost Internet-of-Things (IoT) device. A system can include a device (e.g., a smartphone, or a laptop) that can render a three-dimensional (3D) map of an environment (e.g., a room) that includes the misplaced or lost IoT device and overlays proximity detection technology to present a visual map showing the precise location of an IoT device relative to other objects in the environment. This is particularly useful in environments that include numerous objects that can conceal IoT devices or interfere with tracking apps that, for example, can ping the IoT devices to generate audible alerts. For example, IoT devices can fall behind furniture, get misplaced in a drawer, or get wedged between couch cushions. As a result, an owner of the IoT device cannot readily perceive the location of the IoT device or hear audible alerts generated by the device when using a conventional tracking app.

IoT devices are widely accepted and developing technology that can help users in their everyday lives. For example, by using an IoT device such as a smart home device, users can automate processes such as turning on lights, adjusting temperature, and locking the door. Despite the benefits of IoT devices, if a user was to lose their IoT device, the user can have a difficult time locating the device. For instance, smart home devices can only provide a general location on a map to indicate where the device is currently located. Other than that, the device may play a remote alarm to help the user locate the device. However, in the case that the device is no longer connected to a power source, the remote alarm will not function. Therefore, the action of searching for an IoT device can provide a sub-optimal user experience, since the user may spend an excessive amount of time searching for the device.

The disclosed technology can include a smartphone that includes a sensor for three-dimensional (3D) visualization of a room combined with a proximity sensor for determining distances between the tracking device and the IoT device or relative to other objects in the environment. An example of the 3D visualization sensor includes a LIDAR (light detection and ranging) sensor that can capture the 3D image of the room. For example, a user can position a smartphone to scan the room by using the laser to travel around and measure distances to objects in the room based on timing of light pulses. By scanning the environment, the smartphone can capture and generate a 3D map of the environment. Moreover, an example of a proximity sensor includes Bluetooth proximity sensing, such as Bluetooth Mesh Networking that can receive a proximate location of a misplaced IoT device. For example, by using Bluetooth Low Energy (BLE), a smartphone can search for the IoT device based on signal strength.

After receiving a proximate location of the IoT device, the system including the smartphone can augment the 3D map to identify a location of the IoT device in the environment. For example, if a user drops their IoT device behind their nightstand, the smartphone can present a proximate location of the IoT device (e.g., the user is two feet away from the lost device). The system can locate the lost IoT device by mapping the approximate location in the 3D map of the room. Thus, the system detects the location of the misplaced IoT device and presents that location in a visualization of the room that is readily perceptible. That is, the technology adds visual context that aids the user in retrieving a misplaced or lost IoT device.

In some implementations, the system can also recognize objects in a room and consider dimensions of the lost device to provide for useful location information. For example, the system can use a machine learning model trained on images of the IoT device to recognize the IoT device on the 3D map. Aside from that, the machine learning model can determine the location of the IoT device using the historical activity of the user and the device. After determining the location of the IoT device, the system can generate a notification to the user. The notification can alert the user to the location where the machine learning model recognized the IoT device. For example, the system can recognize the user's smartwatch fallen under the bed. In another example, the system may detect the user's smartwatch is under the bed because the machine learning model outputs that it is most likely located near the bed since the location history indicates that the smartwatch is usually kept next to the bed. The system can then alert the user with a message to their device stating the location and an alert that the missing smartwatch is under the bed.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

The network 100 may support IoT tracking services, for example, IoT services provided by an application of the wireless devices 104. For instance, the location of a missing IoT device provided by an application of the wireless devices 104 may be communicated between multiple wireless devices 104 connected to the network 100. In other cases, the network 100 may include one or more services needed to provide the location of the missing IoT device. For example, IoT tracking service may be stored on a remote server of the network 100 that is communicatively coupled to the wireless devices 104. A remote server of the network 100 may store the location data of the IoT device. In another example, IoT tracking service may store the mapping of the environment including the indication of the location of the IoT device in the 3D visualization on a remote server.

Location Detection of IoT Device

Figure 2:
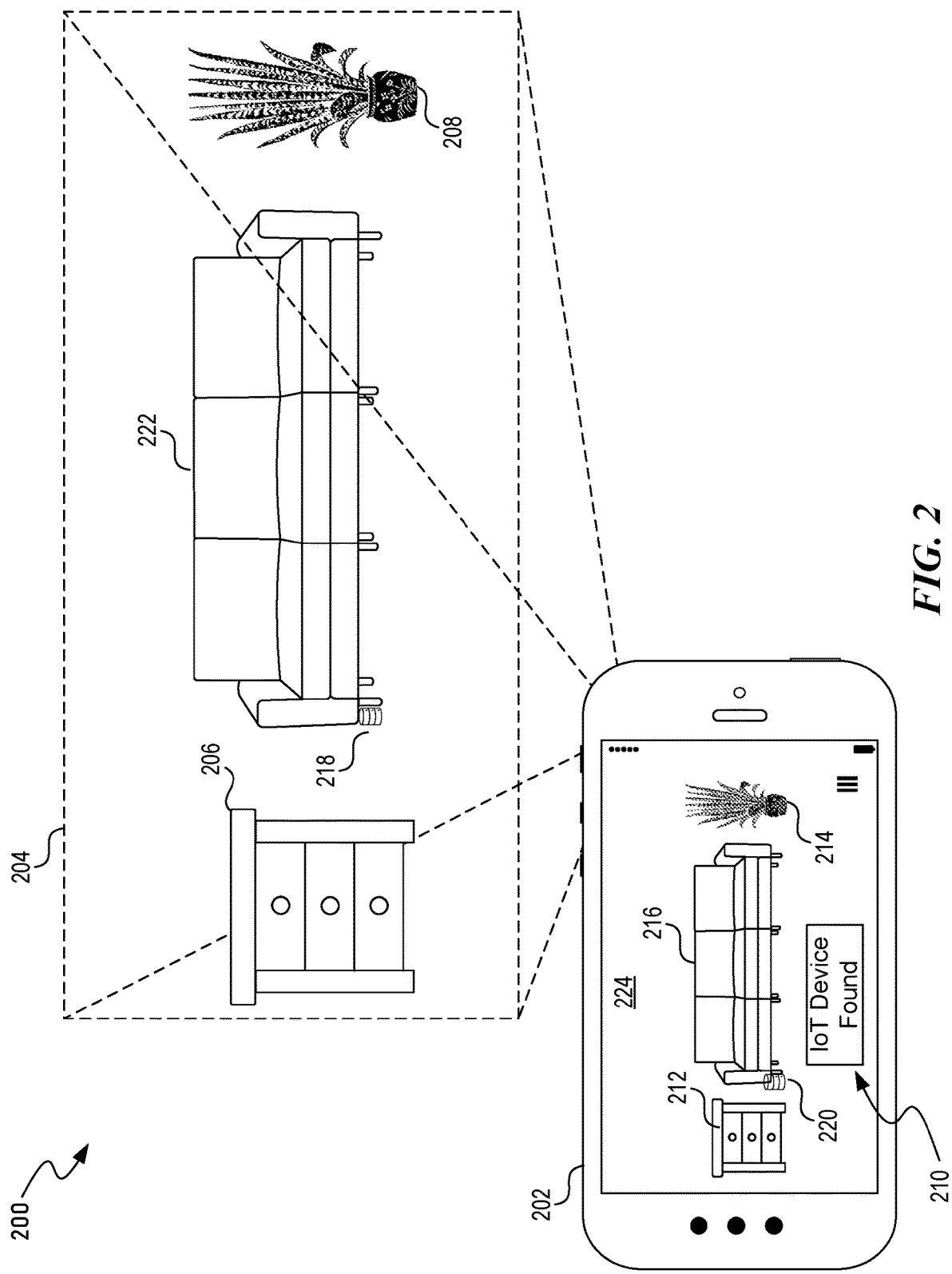
FIG. 2 is a schematic diagram that illustrates a handheld mobile device that is operable to generate a three-dimensional (3D) visualization of an environment and presenting a location of an Internet-of-Things (IoT) device in that visualization.

FIG. 2 is a schematic diagram 200 that illustrates a handheld mobile device 202 that is operable to generate a three-dimensional (3D) visualization of an environment for detecting a location of an Internet-of-Things (IoT) device in the visualization.

The IoT device detection technology can operate to describe physical objects (or groups of such objects) with sensors, processing ability, software, and other technologies that connect and exchange data with other devices and systems over the Internet or other communications networks. In the consumer market, IoT technology is most synonymous with products pertaining to the concept of the "smart home," including devices and appliances (such as lighting fixtures, thermostats, home security systems, cameras, and other home appliances) that support one or more common ecosystems and can be controlled via devices associated with that ecosystem, such as smartphones and smart speakers. A growing portion of IoT devices are created for consumer use, that enable connected vehicles, home automation, wearable technology, connected health, and appliances with remote monitoring capabilities.

The handheld mobile device 202 includes a visualization sensor (not shown) capable of capturing a 3D visualization of a physical environment 204. As illustrated, the physical environment 204 contains physical objects that include a table 206, a plant 208, an IoT device 218, and a couch 222. The physical environment 204 is used to create a 3D visualization environment 224 by scanning the visualization sensor of the handheld mobile device 202 across the physical environment 204. The 3D visualization environment 224 includes visualized objects such as a visualized table 212, a visualized plant 214, and a visualized couch 216. The handheld mobile device 202 displays a notification 210 and an indication 220 of the location of the IoT device 218.

The handheld mobile device 202 captures the 3D visualization of the physical environment 204 including the IoT device 218 and one or more physical objects (e.g., the table 206, the plant 208, and the couch 222), to search for a missing IoT device. For example, a user may wish to find a missing IoT device such as AirPods®. To accomplish this, the user can hold the handheld mobile device 202 and capture the 3D visualization of the physical environment 204 to create a 3D visualization environment 224 to locate the missing IoT device 218 in the physical environment 204.

In some aspects, to create a 3D visualization environment 224, the visualization sensor can include a built-in LiDAR scanner. LiDAR is an acronym for "light detection and ranging" or "laser imaging, detection, and ranging." LiDAR technology includes a method for determining ranges by targeting an object or a surface with a laser and measuring the time for the reflected light to return to the receiver. It is sometimes called 3D laser scanning, a special combination of 3D scanning and laser scanning. LiDAR uses ultraviolet, visible, or near-infrared light to image objects to make high-resolution maps; therefore, the LiDAR scanner can emit a grid of dots in a form of near-infrared wavelengths and measure the amount of time it takes for the dots to travel from the handheld mobile device 202 to the physical environment 204. This allows the handheld mobile device 202 to accurately capture the depth of the physical environment 204. After that, to locate the missing IoT device 218, the handheld mobile device 202 can estimate a distance between the IoT device 218 and at least the handheld mobile device or one or more physical objects (e.g., the table 206, the plant 208, and the couch 222).

The handheld mobile device 202 includes a proximity sensor (not shown) capable of estimating a distance between a IoT device (e.g., IoT device 218) and at least the handheld mobile device 202 and/or one or more physical objects (e.g., the table 206, the plant 208, or the couch 222). The proximity sensor is configured to estimate the distance based on one or more characteristics of signals exchanged with the IoT device 218. The proximity sensor can perform a Bluetooth® search for the IoT device 218 to receive a proximate location of the IoT device 218. Bluetooth® is a short-range wireless technology standard that is used for exchanging data between fixed and mobile devices over short distances and building personal area networks (PANs). It employs UHF radio waves in the ISM bands, from 2.402 GHz to 2.48 GHz. It is mainly used as an alternative to wire connections, to exchange files between nearby portable devices and connect cell phones and music players with wireless headphones. However, in the disclosed technology the Bluetooth® search includes scanning the environment for nearby radio signals for the IoT device 218.

By scanning the physical environment 204 with the handheld mobile device 202, the proximity sensor can determine the proximate location of the IoT device 218 by finding the specific area within the physical environment 204 where the handheld mobile device 202 receives the strongest signal from the IoT device 218. For example, while the user is scanning the physical environment 204, the proximity sensor can perform a Bluetooth® search for the missing IoT device 218 to determine where in the physical environment 204, the missing IoT device 218 is most likely located (e.g., such as near couch 222).

The handheld mobile device 202 can augment the 3D visualization environment 224 with location data of the IoT device 218 based on the estimate distance between the IoT device 218 and at least the handheld mobile device 202 and/or one or more physical objects (e.g., the table 206, the plant 208, and the couch 222). After augmenting the 3D visualization environment 224, the handheld mobile device 202 can display, on the display device (e.g., handheld mobile device 202), a mapping of the physical environment 204 including an indication 220 of the location of the IoT device 218 in the 3D visualization environment 224.

The location of the IoT device 218 is presented in the 3D visualization environment 224 relative to one or more physical objects (e.g., the table 206, the plant 208, and the couch 222). For example, since each virtual object (e.g., the visualized table 212, the visualized plant 214, and the visualized couch 216) corresponds to each physical object (e.g., the table 206, the plant 208, and the couch 222), handheld mobile device 202 will display the indication 220 of IoT device 218 relative to the virtual objects (e.g., the visualized table 212, the visualized plant 214, and the visualized couch 216) on the screen of the display device. To accomplish this, the handheld mobile device 202 can recognize types or dimensions of one or more physical objects (e.g., the table 206, the plant 208, and the couch 222). While augmenting the 3D visualization environment 224 and generating virtual objects (e.g., the visualized table 212, the visualized plant 214, and the visualized couch 216), the handheld mobile device 202 can present the mapping of the environment to include information that describes the proximate location of the IoT device 218 relative to the types or the dimensions of the one or more physical objects (e.g., the table 206, the plant 208, and the couch 222). The handheld mobile device 202 may use a machine learning model to determine the proximate location of the IoT device 218.

The handheld mobile device 202 can include or use a machine learning model trained on a dataset including data items from the IoT device 218 and physical environment 204 which includes the IoT device 218. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive data inputs such as the dimensions and images of the IoT device 218. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to predict the location of the missing IoT device 218. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A first machine learning model can be trained with supervised learning, where the training data includes spatial information of the IoT device 218 as input and a desired output, such as a list of potential locations of the missing IoT device 218. For example, in some implementations, the machine learning model can predict the distance with the machine learning model to output the location of the IoT device 218 by processing data of the 3D visualization. In particular, the machine learning model can be trained using location data. The handheld mobile device 202 can generate the location data by recording the tracking activity of the IoT device 218 including historical use and locations.

In another implementation, the handheld mobile device 202 can communicatively couple to a telecommunications network that administers an IoT tracking service and the handheld mobile device 202 is subscribed to the IoT tracking service. The IoT tracking service can store the location data of the IoT device 218. The handheld mobile device 202 can receive location data from the IoT tracking service, therefore allowing the machine learning model to generate a prediction of where the missing IoT device 218 is located. Output from the first machine learning model can be compared to the desired output of the actual location of the IoT device 218 and based on the comparison, the first machine learning model can be modified, such as by changing weights between nodes of the neural network or parameters of the functions used at each node in the neural network (e.g., applying a loss function). After applying the additional data (e.g., location data from the IoT tracking service) in the training data and modifying the first model in this manner, a second machine learning model can be trained to predict the proximate location of the IoT device 218. By increasing the training dataset with location data, a second machine learning model can increase the accuracy in predicting where an IoT device is hidden or misplace.

After generating the prediction, the handheld mobile device 202 will update the mapping of the environment to include the indication 220 of the location of the IoT device 218 in the 3D visualization environment 224. Finally, the handheld mobile device 202 can receive or generate a notification 210. The notification alerts the user to the IoT device 218 within the physical environment 204. In another implementation, after a user has found the missing IoT device, the user may want to update an older IoT device. However, the user may not know where the location of this older IoT device, and the older IoT device has no battery life left. The handheld mobile device 202 may receive a user request to detect an additional IoT device in the environment. The user request may include the last known location of the additional IoT device within the physical environment 204. The handheld mobile device 202 can recapture the 3D visualization of the physical environment 204. The handheld mobile device 202 can estimate the distance between the additional IoT device and at least the handheld mobile device 202 or one or more physical objects within the physical environment 204. The handheld mobile device 202 can augment a new 3D visualization with location data of the IoT device based on the estimate distance and display a new mapping based on the new 3D visualization. This allows the user to find the older IoT device despite it having no battery life left, such that the user is unable to cause the older IoT device play a sound for detection.

Figure 3:
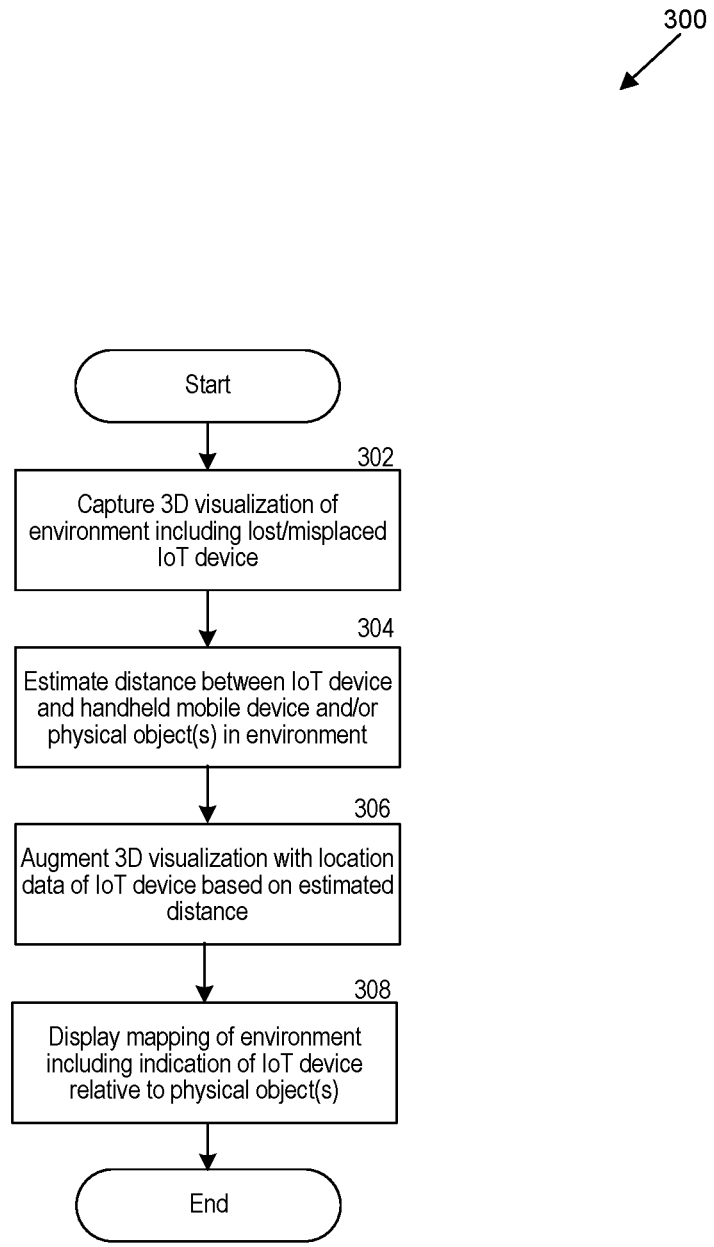
FIG. 3 is a flow diagram that illustrates a method for generating a 3D visualization of an environment including an indication of a location of an IoT device in that environment.

FIG. 3 is a flow diagram that illustrates a method 300 for generating a 3D visualization of an environment that includes an indication of a location of an IoT device in that environment. The method 300 can be performed by a system including, for example, a handheld mobile device (e.g., smartphone) and/or a server coupled to the handheld mobile device over a communications network (e.g., a telecommunications network). In one example, the handheld mobile device includes a visualization sensor, a proximity sensor, and a display device (e.g., touchscreen). The handheld mobile device and/or server include at least one hardware processor, and at least one non-transitory memory storing instructions that, when executed by the at least one hardware processor, cause the system to perform the method 300.

At 302, the system causes the visualization sensor to capture a 3D visualization of the environment (e.g., a room) including the IoT device (e.g., earbuds) and one or more physical objects (e.g., furniture). The visualization sensor is disposed in the handheld mobile device and configured to capture the 3D visualization by, for example, scanning the handheld mobile device across the environment. In one example, the visualization sensor is a sensor with a built-in light detection and ranging (LiDAR) scanner configured to scan the environment. The environment can be a user-selected area that potentially includes the IoT device (e.g., where the user last saw the IoT device). The built-in LiDAR scanner can be configured to cause the handheld mobile device to emit a grid of dots in a form of near-infrared wavelengths. The handheld mobile device can measure an amount of time it takes for the dots to travel from the handheld mobile device to the environment and reflected back to a receiver of the handheld mobile device. The measurements are used to generate the 3D visualization.

At 304, the system causes the proximity sensor to estimate a distance between the IoT device and the handheld mobile device and/or the one or more physical objects. In one example, the proximity sensor is configured to estimate the distance based on one or more characteristics of radio and/or data signals exchanged with the IoT device. In one example, the system can perform a search operation (e.g., Bluetooth search) for radio signals indicative of a proximate location of the IoT device. The search operation includes scanning the environment for nearby radio signals emitted by the IoT device. The proximate location can include a specific area within the environment from which the handheld mobile device received the strongest radio signals from the IoT device compared to other radio signals received from other areas within the environment.

In one embodiment, the system records tracking activity including historical use and locations of the IoT device. As such, the location data can be generated additionally based on the historical use and locations of the IoT device. For example, the location information can be biased toward areas where the user most commonly places the IoT device or the last detected location of the IoT device.

At 306, the system augments the 3D visualization with location data of the IoT device based on the estimate distance between the IoT device and the handheld mobile device and/or the one or more physical objects. In one example, the system recognizes types or dimensions of the physical object(s) and modify the 3D visualization to include the location of the IoT device based on the estimate of the location of the IoT device relative to the handheld mobile device and/or the physical object(s). The system can dynamically update a 3D visualization to include multiple IoT devices and/or generate separate 3D visualizations for different IoT devices. In one example, the system can receive a user request to detect an additional IoT device in the environment where the user request comprises a last known location of the additional IoT device within the environment. The system can cause the visualization sensor to recapture the 3D visualization of the environment and cause the proximity sensor to estimate a distance between the additional IoT device and at least the handheld mobile device or the physical object(s) within the environment.

In some embodiments, a machine learning model that is located at a remote server or at the handheld mobile device is trained on a dataset including data items of multiple IoT devices and multiple environments. At least some of the multiple environments include the multiple IoT devices such that the system is further caused to predict the distance with the machine learning model to output the location of the IoT device by processing data of the 3D visualization. In one example, a user submits spatial information about the IoT device, where the spatial information includes a size and a shape of the IoT device. The system can generate, using a first machine learning model, a list of possible locations of the IoT device and determine, using a second machine learning model, the location of the IoT device. The second machine learning model can include input of location data of the IoT device.

At 308, the system can cause the display device of the handheld mobile device to display a mapping of the environment including an indication of the location of the IoT device overlayed on or embedded in the 3D visualization. The location of the IoT device is presented in the 3D visualization relative to the one or more physical objects. In one example, the system can present the mapping of the environment to include information that describes the location of the IoT device relative to the types or the dimensions of the more physical object(s). In one example, the handheld mobile device presents a notification that alerts a user of the presence of IoT device such as "your earbuds are wedged in the couch cushions."

In one implementation, the handheld mobile device communicatively couples over a telecommunications network to a remote server that administers an IoT tracking service. The handheld mobile device is subscribed to the IoT tracking service and the mapping of the environment includes the indication of the location of the IoT device in the 3D visualization as generated by the IoT tracking service. In one example, the IoT tracking service stores the location data of the IoT device and location data includes the location tracking history of the IoT device, which can be used to predict the location of the IoT device in the environment.

Computer System

Figure 4:
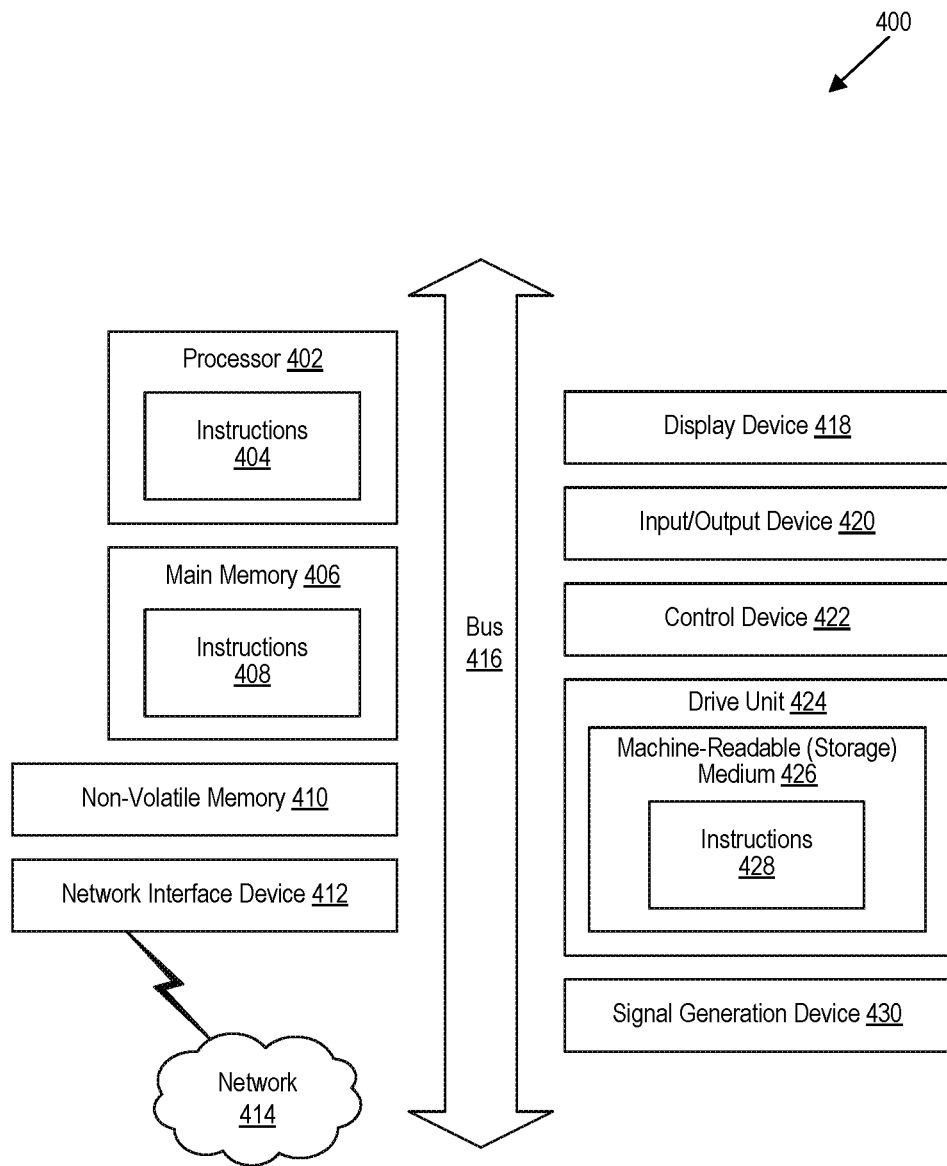
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system operable to generate a three-dimensional (3D) visualization of an environment including a location of an Internet-of-Things (IoT) device detected in that environment, the system comprising:
    a handheld mobile device including:
        a visualization sensor having a built-in light detection and ranging (LiDAR) scanner configured to scan the environment,
        wherein the environment is a user-selected area that potentially includes the IoT device, and
        wherein the built-in LiDAR scanner is configured to scan the environment and further cause the handheld mobile device to:
        emit a grid of dots in a form of near-infrared wavelengths, and
        measure an amount of time it takes for the dots to travel from the handheld mobile device to the environment and reflected back to a receiver of the handheld mobile device;

a proximity sensor;
a display device;
at least one hardware processor; and
at least one non-transitory memory storing instructions, which, when executed by the at least one hardware processor, cause the system to:
cause the visualization sensor to capture a 3D visualization of the environment including the IoT device and one or more physical objects,
wherein the visualization sensor is disposed in the handheld mobile device and configured to capture the 3D visualization by scanning the handheld mobile device across the environment;
cause the proximity sensor to estimate a distance between the IoT device and at least the handheld mobile device or the one or more physical objects,
wherein the proximity sensor is configured to estimate the distance based on one or more characteristics of signals exchanged with the IoT device;
augment the 3D visualization with location data of the IoT device based on the estimate distance between the IoT device and the at least the handheld mobile device or the one or more physical objects; and
display, on the display device, a mapping of the environment including an indication of the location of the IoT device in the 3D visualization,
wherein the location of the IoT device is presented in the 3D visualization relative to the one or more physical objects.

2. The system of claim 1 further caused to:
recognize types or dimensions of the one or more physical objects, and
present the mapping of the environment to include information that describes the location of the IoT device relative to the types or the dimensions of the one or more physical objects.

3. The system of claim 1 further comprising:
a machine learning model trained on a dataset including data items of multiple IoT devices and multiple environments,
wherein at least some of the multiple environments include the multiple IoT devices, and
wherein the system is further caused to:
predict the distance with the machine learning model to output the location of the IoT device by processing data of the 3D visualization.

4. The system of claim 1 further caused to:
record tracking activity including historical use and locations of the IoT device; and
generate the location data based on the historical use and locations of the IoT device.

5. The system of claim 1 further caused to:
communicatively couple to a telecommunications network that administers an IoT tracking service,
wherein the handheld mobile device is subscribed to the IoT tracking service; and
wherein the mapping of the environment including the indication of the location of the IoT device in the 3D visualization is received from the IoT tracking service.

6. The system of claim 1, wherein to cause the proximity sensor to estimate a distance between the IoT device and at least the handheld mobile device or the one or more physical objects comprises causing the system to:
perform a Bluetooth search for the IoT device to receive a proximate location of the IoT device,
wherein the Bluetooth search includes a scan of the environment for radio signals for the IoT device, and
wherein the proximate location includes a specific area within the environment where the handheld mobile device receives a strongest signal from the IoT device.

7. The system of claim 1 further caused to:
receive a user request to detect an additional IoT device in the environment,
wherein the user request comprises a last known location of the additional IoT device within the environment;
cause the visualization sensor to recapture the 3D visualization of the environment;
cause the proximity sensor to estimate a distance between the additional IoT device and at least the handheld mobile device or the one or more physical objects within the environment;
augment a new 3D visualization with location data of the IoT device based on the estimate distance between the IoT device and the at least one of the handheld mobile device or the one or more physical objects; and
display, on the display device, a new mapping of the environment including an indication of the location of the additional IoT device in the new 3D visualization,
wherein the location of the additional IoT device is presented in the new 3D visualization relative to the one or more physical objects.

8. A method to generate a three-dimensional (3D) visualization of an environment including a location of an Internet-of-Things (IoT) device detected in that environment, the method comprising:
capturing, using a visualization sensor, a 3D visualization of the environment including the IoT device and one or more physical objects,
wherein the visualization sensor is disposed in a handheld mobile device to capture the 3D visualization by scanning the handheld mobile device across the environment;
estimating, using a proximity sensor, a distance between the IoT device and the handheld mobile device or the one or more physical objects,
wherein the proximity sensor is configured to estimate the distance based on one or more characteristics of signals exchanged with the IoT device;
augmenting the 3D visualization with location data of the IoT device based on the estimate distance between the IoT device and at least the handheld mobile device or the one or more physical objects; and
displaying, on the display device, a mapping of the environment including an indication of the location of the IoT device in the 3D visualization,
wherein the location of the IoT device is presented in the 3D visualization relative to the one or more physical objects, and
wherein displaying, on the display device, the mapping of the environment including the indication of the location of the IoT device in the 3D visualization further comprises:
receiving, from a user, spatial information about the IoT device,
wherein the spatial information comprises a size and a shape of the IoT device;
generating, using a first machine learning model, a list of possible locations of the IoT device; and
determining, using a second machine learning model, the location of the IoT device, wherein the second machine learning model comprises input of location data of the IoT device.

9. The method of claim 8 further comprising:
communicatively coupling to a telecommunications network that administers an IoT tracking service,
wherein the handheld mobile device is subscribed to the IoT tracking service; and
wherein the mapping of the environment including the indication of the location of the IoT device in the 3D visualization is received from the IoT tracking service.

10. The method of claim 9:
wherein the IoT tracking service stores the location data of the IoT device, and
wherein location data comprises the location tracking history of the IoT device.

11. The method of claim 8 further comprises:
causing the handheld mobile device to present a notification that is configured to alert a user of the IoT device within the environment.

12. At least one non-transitory computer-readable storage medium storing instructions, which, when executed by at least one data processor of a system, cause the system to:
cause a first sensor to capture a 3D visualization of an environment including an IoT device and one or more physical objects,
wherein the first sensor is disposed in an electronic device and configured to capture the 3D visualization;
cause a second sensor to estimate a location of the IoT device relative to at least the electronic or the one or more physical objects;
modify the 3D visualization to include the location of the IoT device based on the estimate of the location of the IoT device relative to at least the electronic device or the one or more physical objects; and
present, on a display device, the modified 3D visualization of the environment including an indication of the location of the IoT device,
wherein the location of the IoT device is presented in the modified 3D visualization relative to the one or more physical objects, and
wherein presenting the modified 3D visualization of the environment including the indication of the location of the IoT device in the 3D visualization further comprises causing the system to:
receive, from a user, spatial information about the IoT device,
wherein the spatial information comprises a size and a shape of the IoT device,
generate, using a first machine learning model, a list of possible locations of the IoT device, and
determine, using a second machine learning model, the location of the IoT device,
wherein the second machine learning model comprises input of location data of the IoT device.

13. The at least one non-transitory computer-readable storage medium of claim 12, wherein the system is further caused to:
communicatively couple to an IoT tracking service,
wherein the electronic device is subscribed to the IoT tracking service; and
wherein data for the modified 3D visualization of the environment including the indication of the location of the IoT device is received from the IoT tracking service.

14. The at least one non-transitory computer-readable storage medium of claim 12, wherein the system is further caused to:
recognize types or dimensions of the one or more physical objects; and
present the 3D visualization of the environment to include information that describes the location of the IoT device relative to the types or the dimensions of the one or more physical objects.

15. The at least one non-transitory computer-readable storage medium of claim 12, wherein to cause the second sensor to estimate the location of the IoT device comprises causing the system to:
perform a search operation for radio signals indicative of a proximate location of the IoT device,
wherein the search operation includes scanning the environment for nearby radio signals emitted by the IoT device, and
wherein the proximate location includes a specific area within the environment from which the electronic device received strongest radio signal from the IoT device relative to other radio signals received from other areas within the environment.

16. The at least one non-transitory computer-readable storage medium of claim 12:
wherein the first sensor includes a built-in LiDAR scanner configured to scan the environment, and
wherein the environment is a user-selected area where a user last saw the IoT device.

* * * * *